United States Patent
Tho et al.

(10) Patent No.: US 8,306,500 B2
(45) Date of Patent: Nov. 6, 2012

(54) MOBILE TERMINAL

(75) Inventors: Gihoon Tho, Seoul (KR); Seungsu Yang, Seoul (KR); Youngtae Im, Gyeonggi-Do (KR); Jaewook Lee, Gyeonggi-Do (KR); Seokyong Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 108 days.

(21) Appl. No.: 12/862,194

(22) Filed: Aug. 24, 2010

(65) Prior Publication Data

US 2011/0053653 A1 Mar. 3, 2011

(30) Foreign Application Priority Data

Aug. 26, 2009 (KR) .................. 10-2009-0079301

(51) Int. Cl.
*H04B 1/08* (2006.01)
(52) U.S. Cl. ...... 455/347; 455/348; 455/349; 455/575.1; 455/566
(58) Field of Classification Search .......... 455/347–349, 455/550.1, 575.1, 575.4, 575.8, 90.3, 566; 361/616, 667, 724–727, 747, 769; 429/97, 429/100; 439/500
See application file for complete search history.

(56) References Cited

U.S. PATENT DOCUMENTS

| | | | | |
|---|---|---|---|---|
| 5,177,672 A | * | 1/1993 | Ito ................................. | 361/741 |
| 5,494,543 A | * | 2/1996 | Okano et al. .................... | 216/33 |
| 5,659,376 A | * | 8/1997 | Uehara et al. ................... | 349/58 |
| 5,804,906 A | * | 9/1998 | Tsutsumi ....................... | 310/322 |
| 6,020,867 A | * | 2/2000 | Shimada et al. ................ | 345/87 |
| 6,747,395 B1 | * | 6/2004 | Satoh et al. .................... | 310/324 |
| 6,762,685 B2 | * | 7/2004 | Muto et al. ................ | 340/573.1 |
| 2002/0056950 A1 | * | 5/2002 | Sato et al. ....................... | 266/87 |
| 2002/0073781 A1 | * | 6/2002 | Hashimoto et al. ............. | 73/641 |
| 2003/0227446 A1 | * | 12/2003 | Ohtsuka ........................ | 345/173 |
| 2004/0202338 A1 | * | 10/2004 | Longbotttom et al. ....... | 381/190 |
| 2005/0054390 A1 | * | 3/2005 | Tuovinen ................... | 455/575.1 |
| 2006/0094480 A1 | * | 5/2006 | Tanaka ....................... | 455/575.1 |
| 2006/0280493 A1 | * | 12/2006 | Kim .............................. | 396/133 |
| 2007/0066274 A1 | * | 3/2007 | Kim .............................. | 455/350 |
| 2008/0122315 A1 | * | 5/2008 | Maruyama et al. ........... | 310/314 |
| 2008/0134255 A1 | * | 6/2008 | Ferris et al. ..................... | 725/62 |
| 2008/0305746 A1 | * | 12/2008 | Griffin et al. .............. | 455/67.11 |
| 2009/0103767 A1 | * | 4/2009 | Kuroda et al. ................ | 381/388 |
| 2009/0156083 A1 | * | 6/2009 | Nakazawa et al. ............. | 445/24 |
| 2010/0240305 A1 | * | 9/2010 | Davis .......................... | 455/41.2 |
| 2010/0253604 A1 | * | 10/2010 | Peters et al. ..................... | 345/30 |
| 2010/0285850 A1 | * | 11/2010 | Paleczny et al. ........... | 455/575.1 |
| 2010/0291965 A1 | * | 11/2010 | Tabe .......................... | 455/550.1 |

* cited by examiner

*Primary Examiner* — Dominic E Rego
(74) *Attorney, Agent, or Firm* — KED & Associates, LLP

(57) ABSTRACT

Disclosed is a mobile terminal including a main body having a display module, a window disposed on a case of the main body to obscure the display module, a touch sensor mounted onto the window and configured to detect a touch input, and a piezoelectric substrate controlled to generate a vibration in response to detection of the touch input and formed in a bar-like shape extending in one direction, the piezoelectric substrate accommodated in a recess portion recessed into one surface of the window at an edge region of the window.

14 Claims, 13 Drawing Sheets

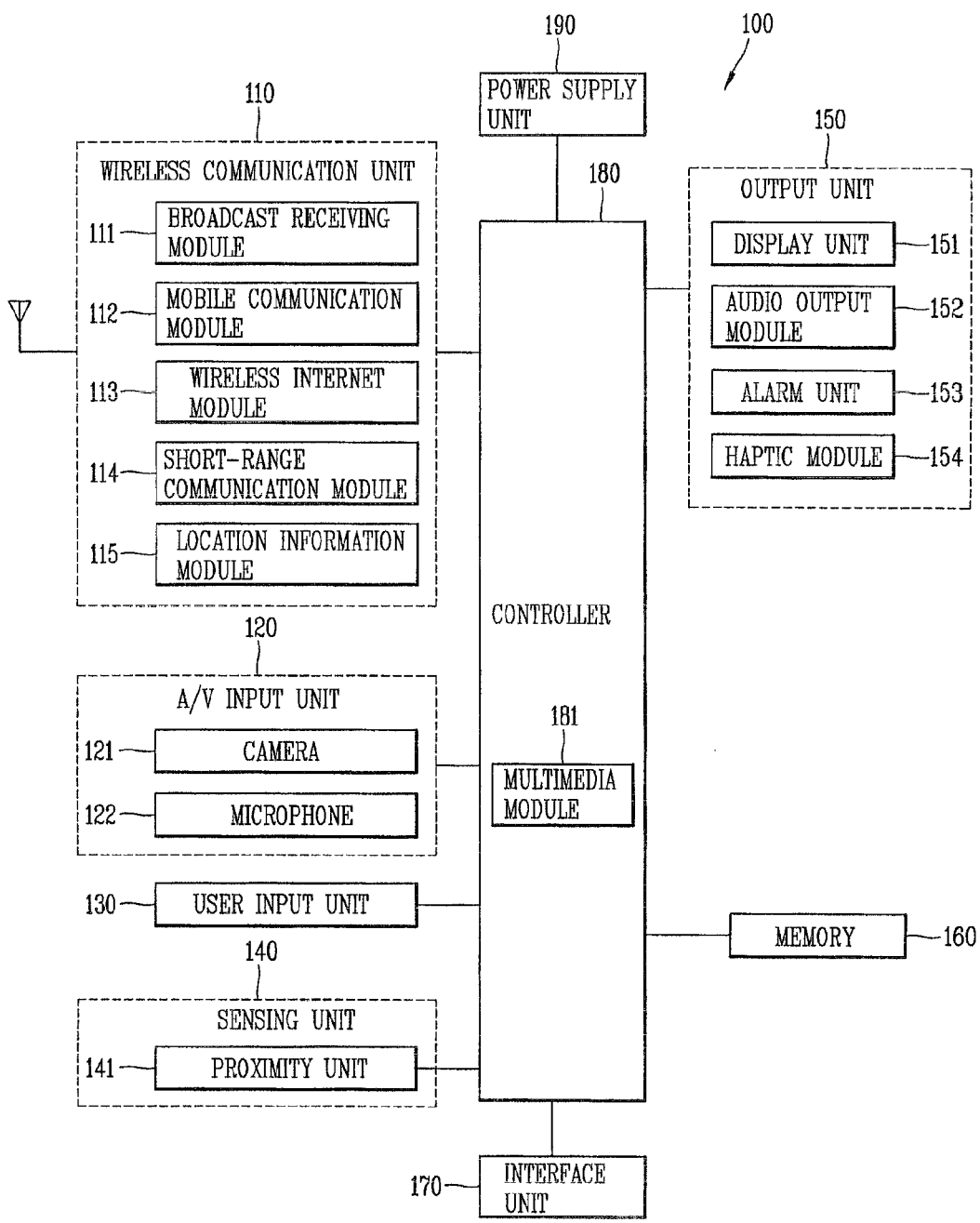

MOBILE TERMINAL

CROSS-REFERENCE TO RELATED APPLICATION

Pursuant 35 U.S.C. §119(a), this application claims the benefit of earlier filing date and right of priority to Korean Application No. 10-2009-0079301, filed on Aug. 26, 2009, the contents of which is incorporated by reference herein in its entirety.

BACKGROUND OF THE INVENTION

1. Field of the Invention

The present invention relates to a mobile terminal capable of receiving a touch input and having a haptic function.

2. Background of the Invention

Terminals may be divided into mobile/portable terminals and stationary terminals according to their mobility. Also, the mobile terminals may be categorized into a handheld terminal and a vehicle mount terminal according to whether it is directly portable by a user.

As it becomes multifunctional, the mobile terminal can be allowed to capture still images or moving images, play music or video files, play games, receive broadcast and the like, so as to be implemented as an integrated multimedia player.

Consequently, a touch screen that a user can feel vibration in response to a touch input may be considered.

SUMMARY OF THE INVENTION

Therefore, an object of the present invention is to provide a mobile terminal, which is allowed to generate a vibration feedback in response to a touch input in a different manner from the related art.

Another object of the present invention is to provide a haptic module for a mobile terminal, which is slimmer and has a superior vibration feedback capability.

To achieve these and other advantages and in accordance with the purpose of the present invention, as embodied and broadly described herein, there is provided a mobile terminal including a main body having a display module, a window disposed on a case of the main body to obscure the display module, a touch sensor mounted onto the window and configured to detect a touch input, and a piezoelectric substrate controlled to generate a vibration in response to detection of the touch input and formed in a bar-like shape extending in one direction, the piezoelectric substrate accommodated in a recess portion recessed into one surface of the window at an edge region of the window.

In one aspect of the present invention, the mobile terminal may include an elastic member, which may be disposed between the case and the window and configured to attenuate a vibration of the piezoelectric substrate transferred to the case. The edge region of the window may define a center region corresponding to the display module, and the elastic member may form a closed loop having a center open so as to obscure the edge region. The mobile terminal may include a vibration motor mounted onto the case and controlled to generate a vibration with a different strength from that of the piezoelectric substrate.

In another aspect of the present invention, the piezoelectric substrate may include a first piezoelectric substrate and a second piezoelectric substrate. The first piezoelectric substrate may be accommodated in the recess portion and have one surface for mounting the elastic member thereon, and the second piezoelectric substrate may be disposed to obscure one surface of the window and mounted onto the case.

In another aspect of the present invention, the edge region may include sides of the window, and the piezoelectric substrate may be provided in plurality to be mounted at the sides in an intersecting manner. The piezoelectric substrates disposed in the intersecting manner may be vibrated in different directions. The piezoelectric substrates disposed in the intersecting manner may be disposed at the sides, respectively, and the piezoelectric substrates mounted onto both sides facing each other may be vibrated in a different direction from the piezoelectric substrates mounted onto another both sides facing each other.

In another aspect of the present invention, the recess portion may be formed to be stepped with respect to a principal surface of the window, and the piezoelectric substrate may be accommodated in the recess portion such that at least one surface is flush with the principal surface of the window. The recess portion may be formed at each of both sides of the window, the both sides facing each other, and the piezoelectric substrate may be provided in plurality to be mounted onto each of the recess portions at the both sides. The mobile terminal may include an elastic member disposed to obscure both the one surface of the piezoelectric substrate and the principal surface of the window, the one surface and the principal surface being flush with each other, and formed along the edge region of the window. The recess portion may be provided with a boundary surface on which the window is melted and then solidified onto the piezoelectric substrate.

In another aspect of the present invention, the touch sensor may be disposed on one of both surfaces of the window facing each other, and the recess portion may be formed at a side surface of the window intersecting with both surfaces of the window, the both surfaces facing each other. An opening for communicating the recess portion with the exterior such that the piezoelectric substrate is inserted into the recess portion may be formed at the side surface of the window.

In another aspect of the present invention, the mobile terminal may include a filler filled between the recess portion and the piezoelectric substrate and hardened by radiation of rays.

In another aspect of the present invention, the piezoelectric substrate may include electrodes formed respectively on both surfaces facing each other, and wires may be mounted onto the electrodes, respectively, to allow an electric connection with a circuit board for controlling the piezoelectric substrate. The piezoelectric substrate may be disposed to face a surface, at which each electrode defines the recess portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram of a mobile terminal in accordance with one embodiment of the present invention;

DETAILED DESCRIPTION OF THE INVENTION

Figure 2A:
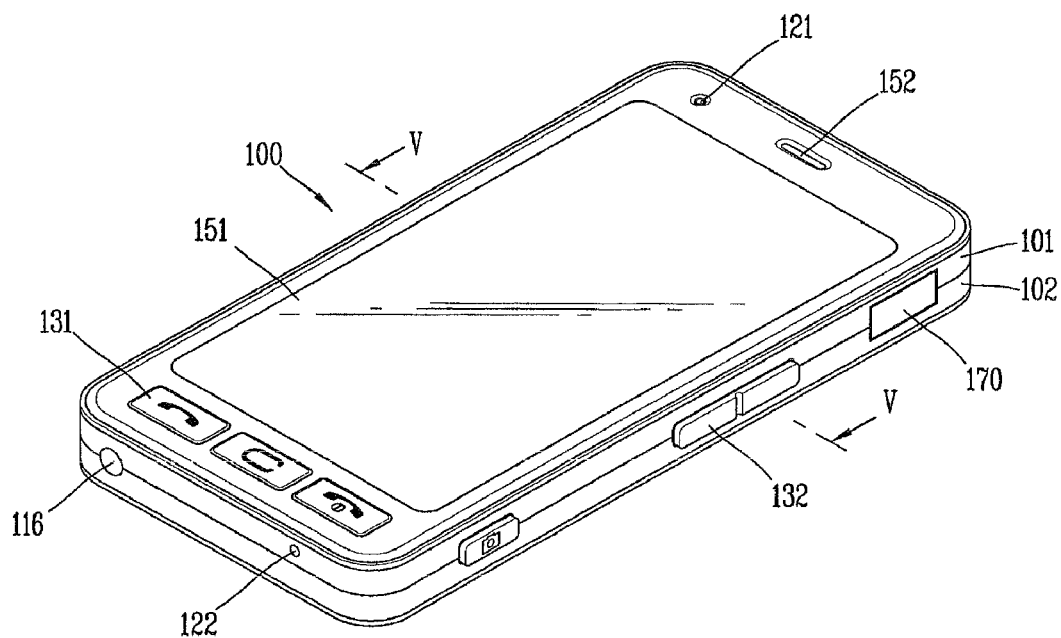
FIG. 2A is a front perspective view of the mobile terminal in accordance with the one embodiment of the present invention.

Description will now be given in detail of an expansion module and a mobile electronic device having the same according to the present invention, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

Hereinafter, suffixes "module" and "unit or portion" for components used herein in description are merely provided only for facilitation of preparing this specification, and thus they are not granted a specific meaning or function.

Mobile terminals described in the present invention may include mobile phones, smart phones, laptop computers, digital broadcasting terminals, personal digital assistants (PDAs), portable multimedia players (PMPs), navigators, and the like. However, it can be easily understood by those skilled in the art that the configurations according to the embodiments disclosed in the specification of the present invention can be applied to stationary terminals, such as digital TV, desktop computer and the like, excluding several cases of being applicable only to mobile terminals.

FIG. 1 is a block diagram of a mobile terminal in accordance with one embodiment of the present invention.

The mobile terminal 100 may comprise components, such as a wireless communication unit 110, an Audio/Video (NV) input unit 120, a user input unit 130, a sensing unit 140, an output unit 150, a memory 160, an interface unit 170, a controller 180, a power supply 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Meanwhile, the sensing unit 140 may include a proximity sensor 141.

The output unit 150 is configured to output an audio signal, a video signal or a tactile signal. The output unit 150 may include a display unit 151, an audio output module 152, an alarm 153 and a haptic module 154.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output module 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a memory card type (e.g., SD or DX memory), Random Access Memory (RAM), Static Random Access Memory (SRAM), Read-Only Memory (ROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

FIG. 2A is a front perspective view of the mobile terminal in accordance with the one embodiment of the present invention.

The mobile terminal disclosed in the present invention has a bar-like body. However, the present invention is not limited to the type, but can be applied to various types, such as a slide type, a folder type, a swing type, a swivel type and the like, each having two or more bodies coupled to each other to be relatively movable.

A body includes a housing (case, casing, cover or the like) configuring an external appearance. In this embodiment, the housing may be divided into a first or front case 101 and a second or rear case 102. A space formed between the front case 101 and the rear case 102 may accommodate various electric components. At least one intermediate case may further be disposed between the front and the rear cases 101 and 102.

Such cases may be injected using a synthetic resin or be formed of a metal, such as stainless steel (STS), titanium (Ti) or the like.

A terminal body, usually the front case 101 may be provided with a display unit 151, an audio output module 152, a camera 121, user input units 130/131 and 132, a microphone 122, optical sensors 142 to 148, an interface unit 170 and the like.

The display unit 151 may occupy most of a main surface of the front case 101. The audio output module 152 and the camera 121 are disposed at a region adjacent to one of both end portions of the display unit 151, and a user input unit 131 and a microphone 122 are disposed at a region adjacent to another end portion thereof. The user input unit 132, the interface unit 170 and the like may be disposed at side surfaces of the front case 101 and the rear case 102.

The display unit 151 may display various types of visible information. Such visual information may be divided, according to their display forms, into letter (character), number, symbol, graphic, icon or the like.

For the input of such information, at least one type of information among the letter, the number, the symbol, the graphic or the icon may be displayed in a preset arrangement, so as to be implemented as a type of keypad. Such keypad may be referred to as a 'soft key'.

The display 151 may operate as one entire region or by being divided into a plurality of regions. For the latter, the plurality of regions may be configured to cooperate with each other.

The user input unit 130 may be manipulated to receive a command input for controlling the operation of the portable terminal 100, and include a plurality of manipulating units 131 and 132. The manipulating units 131 and 132 may be referred to as a manipulating portion. The manipulating portion may be manipulable by a user in any tactile manner.

Contents input by the user input units 131 and 132 may variously be set. For example, the first manipulating unit 131 may be configured to input commands such as START, END, SCROLL or the like, and the second manipulating unit 132 may be configured to input a command, such as adjusting an audio sound, converting the display 151 into a touch-sensitive mode or the like.

Figure 2B:
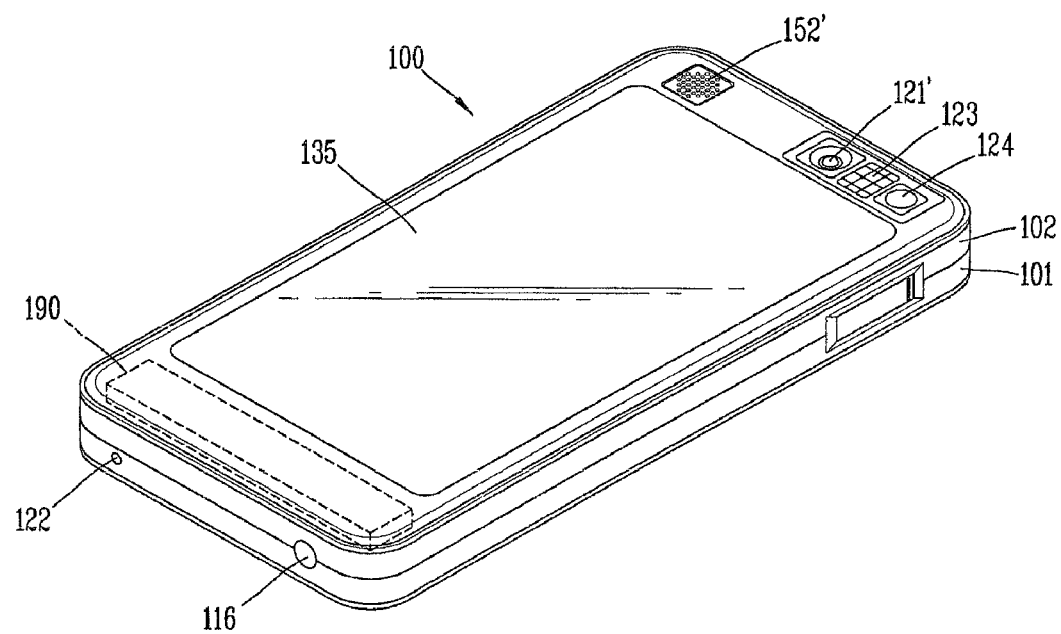
FIG. 2B is a rear perspective view of the mobile terminal in accordance with the one embodiment of the present invention.

FIG. 2B is a rear perspective view of the mobile terminal shown in FIG. 2A.

As shown in FIG. 2B, a rear surface of the terminal body, namely, the rear case 102 may further be provided with a camera 121'. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. Such cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear surface of the terminal body. The audio output module 152' can cooperate with the audio output module 152 to provide stereo output. Also, the audio output module 152' may be configured to operate as a speakerphone.

A broadcast signal receiving antenna 124 may further be disposed at the side surface of the terminal body in addition to an antenna for communications. The antenna 116 configuring a part of the broadcast receiving module 111 (see FIG. 1) may be retractable into the terminal body.

A power supply 190 for supplying power to the portable terminal 100 may be mounted to the terminal body. The power supply 190 may be internally disposed at the terminal body, or be detachably disposed outside the terminal body.

A touch pad 135 for detecting a touch input may further be disposed at the rear case 102. The touch pad 135 may also be configured to be light-transmissive, as similar to the display 151. In this case, if the display 151 is configured to output visible information on its both surfaces, such visible information can be identified via the touch pad 135. Information output on the both surfaces may all be controlled by the touch pad 135. Unlike to this, a display may further be mounted on the touch pad 135 so as to dispose a touch screen even at the rear case 102.

The touch pad 135 operates in cooperation with the display 151 of the front case 101. The touch pad 135 may be disposed at the rear side of the display 151 in parallel. Such touch pad 135 may be the same as or smaller than the display 151.

Hereinafter, the cooperative operation between the display 151 and the touch pad 135 will be described with reference to FIG. 3.

Figure 3:
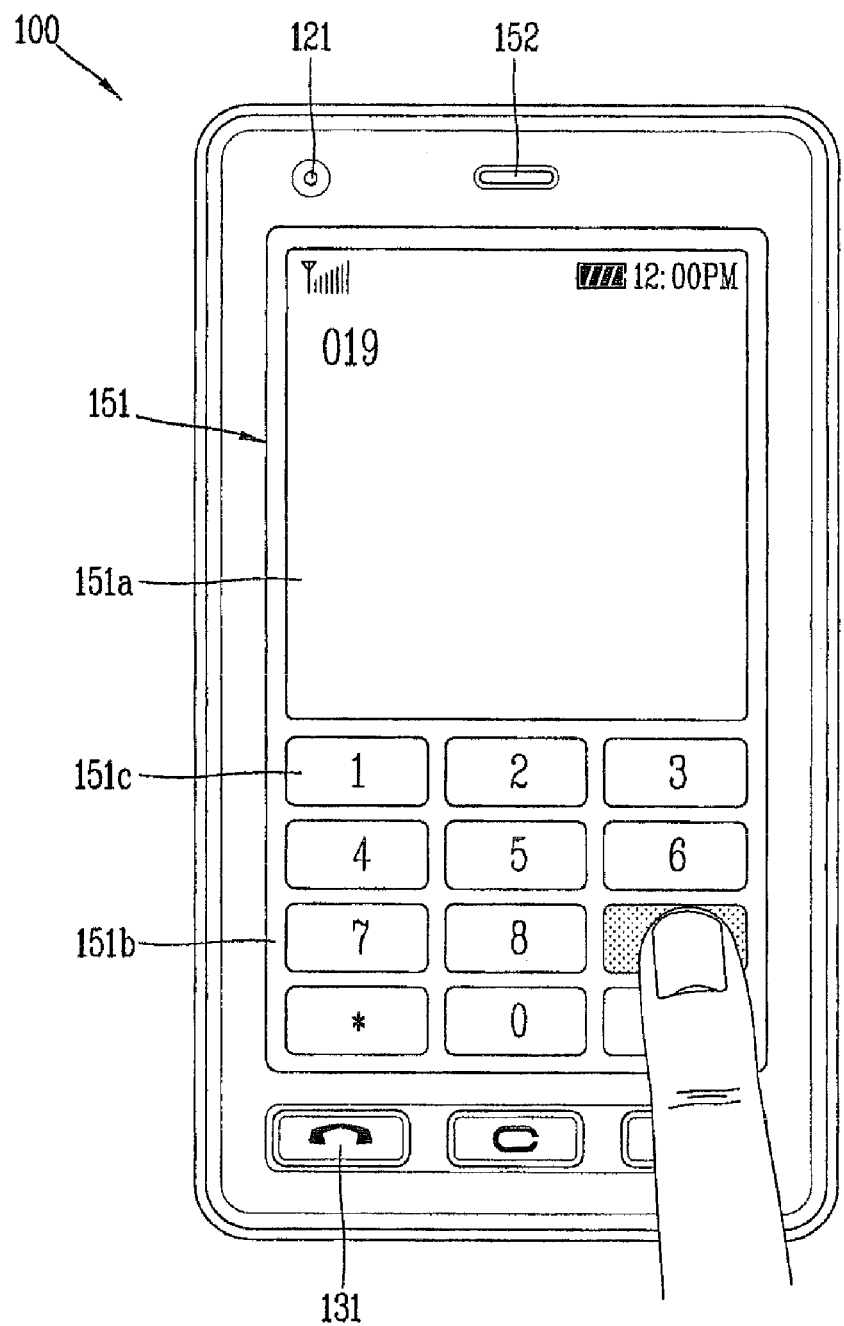
FIG. 3 is a front view showing an operational state a mobile terminal according to the present invention.

FIG. 3 is a front view showing one operational state of a mobile terminal in accordance with the present invention.

The display unit 151 may display various types of visible information. Such visual information may be divided, according to their display forms, into letter (character), number, symbol, graphic, icon or the like.

For the input of such information, at least one type of information among the letter, the number, the symbol, the graphic or the icon may be displayed in a preset arrangement, so as to be implemented as a type of keypad. Such keypad may be referred to as a 'soft key'.

The drawing shows reception of a touch input applied onto a soft key via a front surface of a terminal body.

The display 151 may operate as one entire region or by being divided into a plurality of regions. For the latter, the plurality of regions may be configured to cooperate with each other.

For example, an output window 151a and an input window 151b are displayed on upper and lower portions of the display 151. Soft keys 151c with numbers represented thereon for inputting a phone number or the like are output on the input window 151b. Upon touching one of the soft keys 151c, a number or the like corresponding to the touched soft key 151c is displayed on the output window 151a. When operating the first manipulation unit 131, a call connection for the phone number displayed on the output window 151a is attempted.

Referring to FIG. 3, when a user generates a touch input, the haptic module 154 (see FIG. 1) of the terminal generates a vibration which the user can feel. The vibration may be usually implemented as a vibration of the display 151, unlike the vibration of the cases 101 and 102 (see FIG. 2A) output when the mobile terminal in a vibration mode receives a signal for a wireless communication.

Figure 4:
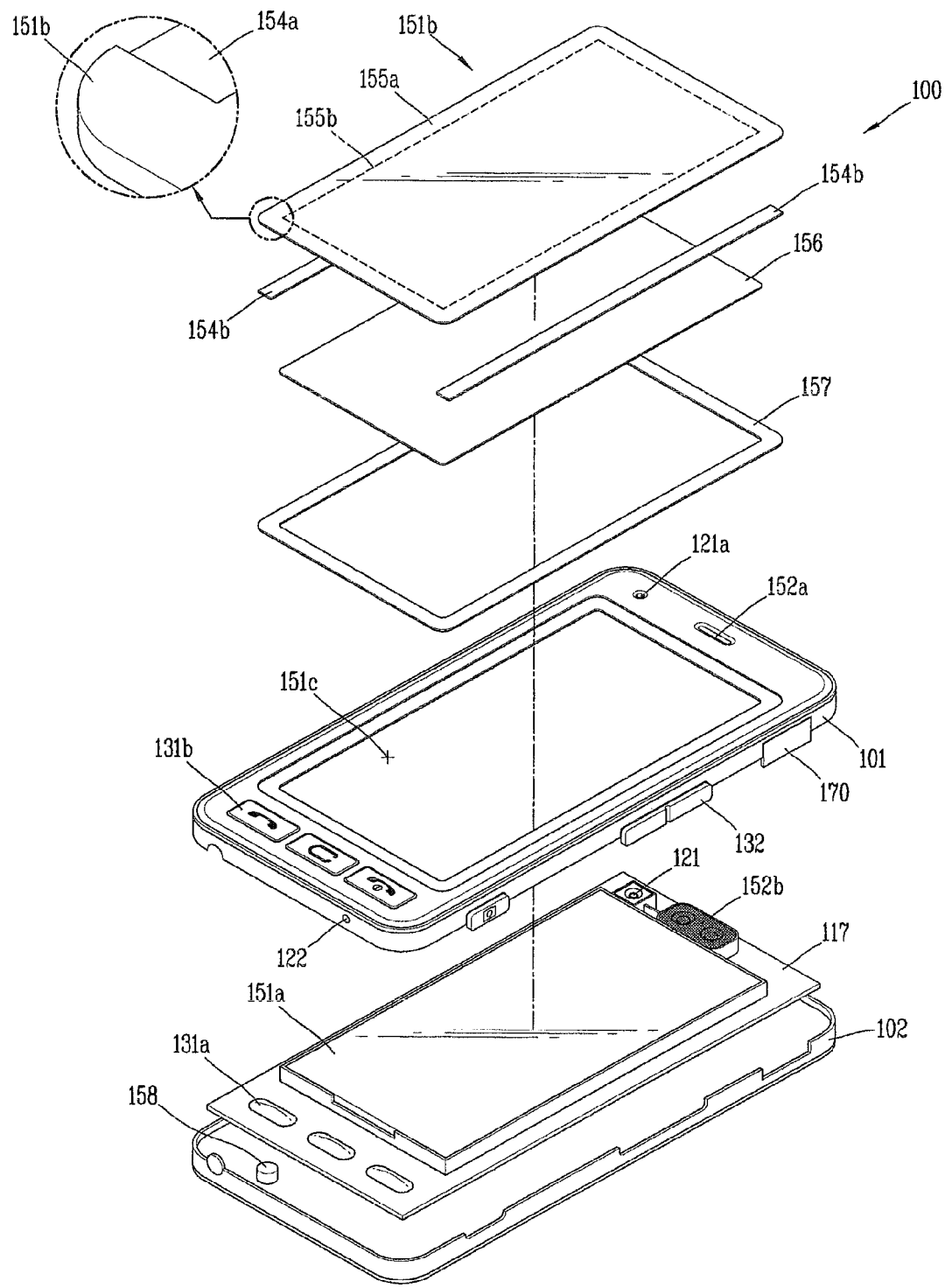
FIG. 4 is a disassembled perspective view of the mobile terminal of FIG. 2A.
Figure 5:
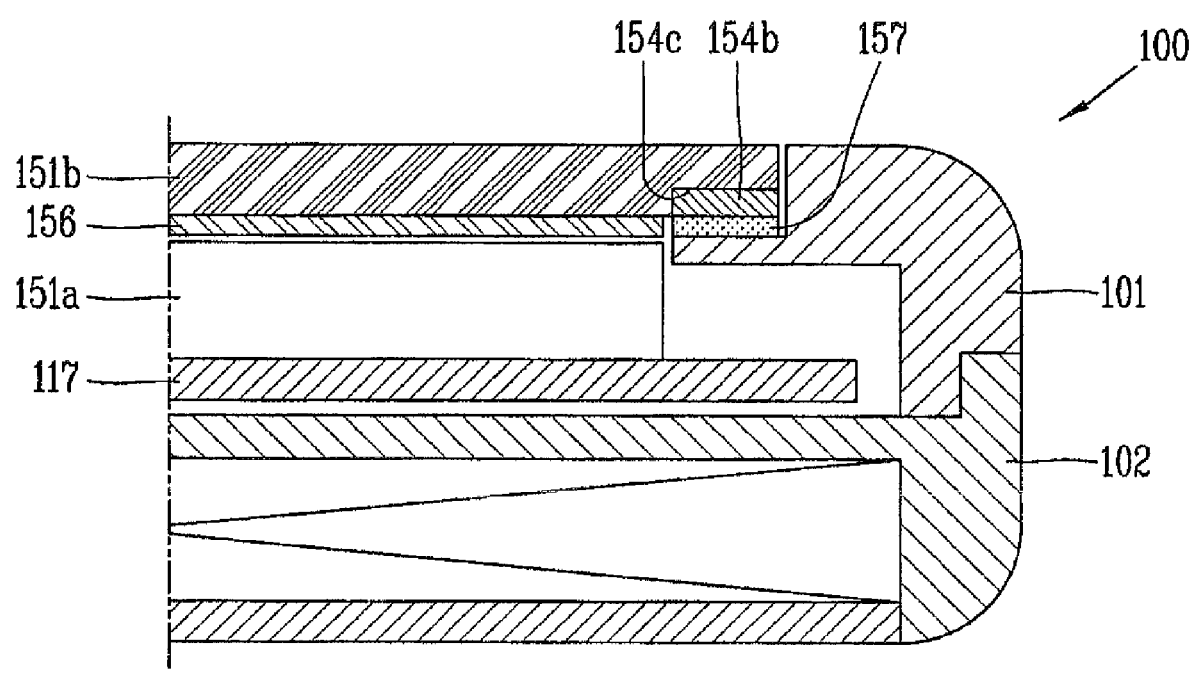
FIG. 5 is a partial sectional view of the mobile terminal taken along the line V-V of FIG. 2A.

Hereinafter, a configuration of the aforesaid mobile terminal operable as aforesaid will be described with reference to FIGS. 4 and 5. FIG. 4 is a disassembled perspective view of the mobile terminal of FIG. 2A, and FIG. 5 is a partial sectional view of the mobile terminal taken along the line V-V of FIG. 2A.

An audio hole 152a corresponding to the audio output module 152 and an image window 121a corresponding to the camera 121 may be formed at one side of the front case 101. The image window 121a may be made of a transparent material.

The rear case 102 may be provided with a circuit board 117. The circuit board 117 may be configured as an example of the controller 180 (see FIG. 1) for running various functions of the mobile terminal. As shown, a speaker 152b, the camera 121, switches 131a and a display module 151a may be mounted onto the circuit board 117.

The speaker 152b may be disposed to correspond to the audio hole 152a, and the camera 121 may be disposed to correspond to the image window 121a. A keypad 131b may be formed adjacent to one end of the front case 101. The keypad 131b may configure the first manipulation unit 131 (see FIG. 2A) in cooperation with the switches 131a.

The window 151b may be coupled to one surface of the front case 101 to cover the display module 151a. The window 151b may be made of a transparent material, for example, light-transmissive synthetic resin, tempered glass or the like. Here, the window 151b may include a non-transparent portion. The non-transparent portion may be made of a non-transparent material or surface-processed to block light, and define an edge region 155a of the window 151b.

The edge region 155a may be configured to be contactable with the front case 101, so the window 151b may be mounted to the front case 101. Here, the edge region 155a may not be limited to the structure of being contactable with the front case 101. The edge region 155a may alternatively be contactable with the circuit board 117, for example.

The window 151b may include a center region 155b having an area corresponding to that of the display module 151a. Accordingly, a user can recognize visible information output on the display module 151a from the outside. The center region 155b may be defined by being covered with the edge region 155a.

The front case 101 may include a window hole 151c corresponding to the window 151b. The display module 151a may be disposed on the rear case 102 to correspond to the window hole 151c. The center region 155b, the window hole 151c and the display module 151a may configure the display unit 151 (see FIG. 1).

A touch sensor 156 may be mounted to the window 151b. The touch sensor 156 may be formed to sense a touch input and be light-transmissive. The touch sensor 156 may be mounted to a rear surface of the window 151b, and be configured to convert the change in capacitance or the like generated on a specific portion of the window 151b into an electric input signal.

A recess portion 154a may be formed at the edge region 155a of the window 151b to be recessed into one surface of the window 151b. The recess portion 154a may be stepped with respect to a principal surface of the window 151b. In detail, the recess portion 154a may extend from the edge region 155a of the window 151b along the edge (side) of the window 151b. The enlarged view of FIG. 4 shows the window 151b viewed from its rear surface. Referring to the enlarged view, the recess portion 154a may be formed to be stepped at each of the rear and side surfaces of the window 151b by being recessed into the rear and side surfaces of the window 151b.

Referring to the drawings, the recess portion 154a may accommodate the piezoelectric substrates 154b. Each of the piezoelectric substrates 154b may extend in one direction in a bar-like shape, and controlled to generate a vibration in response to a user's touch input. The recess portion 154a and the piezoelectric substrates 154b may configure the haptic module 154 (see FIG. 1).

The piezoelectric substrates 154b is formed in a thin, long band and implemented by using a thin board made of a piezoelectric material, for example, a ceramic piezoelectric board. An electrode layer for driving the piezoelectric substrate 154b may be formed on the surface of the ceramic piezoelectric board.

The piezoelectric substrates 154b may be bonded to or double-injected into the recess portion 154a. Each recess portion 154a may be provided with a boundary surface 154c on which the piezoelectric substrate 154b is melted and then solidified. The boundary surface 154c may be a surface of the recess portion 154a coming in contact with the piezoelectric substrate 154b. Also, the boundary surface 154c may be formed as the window 151b in a melted state is solidified onto the piezoelectric substrate 154b, which is inserted into an injection mold of the window 151b upon double injection.

The recess portions 154a may be formed at both sides of the window 151b facing each other. The piezoelectric substrate 154b may be provided in plurality to be mounted to the both side recess portions 154a. The piezoelectric substrate 154b may be accommodated in the recess portion 154a such that at least one surface thereof can be flush with the principal surface of the window 151b, for example, a rear surface thereof. Accordingly, a slimmer haptic module 154 may be embodied.

Referring to the drawings, an elastic member 157 may be disposed at one surface of the piezoelectric substrate 154b. The elastic member 157 may be present between the front case 101 and window 151b, to attenuate a vibration transferred from the piezoelectric substrate 154b to the front case 101.

The elastic member 157 may be disposed to obscure both the one surface of the piezoelectric substrate 154b and the principal surface of the window 151b, which are flush with each other. The elastic member 157 may be formed along the edge region 155a of the window 151b. The elastic member 157 is a sheet of gasket, and made of an elastic material such as urethane, rubber or the like. The elastic member 157 may be, for example, a foam tape or the like having an adhesive property on a surface.

The elastic member 157 may form a closed loop having its center open so as to cover the edge region 155a of the window 151b. The elastic member 157 may be elastically transformed in a thickness direction thereof. The window 151b may secure a space to be vibrated up and down with respect to the front case 101. Also, the elastic member 157 may serve to transfer a vibration of the piezoelectric substrates 154b to the window 151b better than to the cases 101 and 102. That is, the elastic member 157 may isolate the cases 101 and 102 from the vibration of the piezoelectric substrate 154b, thereby implementing a more superior vibration transfer property toward the window 151b.

Still referring to FIGS. 4 and 5, the rear case 102 may be provided with a vibration motor 158. The vibration motor 158 may be controlled to generate a vibration whose strength is different from that of the piezoelectric substrate 154b. For example, when the terminal runs in a vibration mode, a strong vibration notifying a message reception or the like is generated by the vibration motor 158, while a weak vibration as a feedback of a touch input is generated by the piezoelectric substrate 154b. Accordingly, the vibration with respect to the window 151b and the cases 101 and 102 can be independently controlled.

Figure 6A:
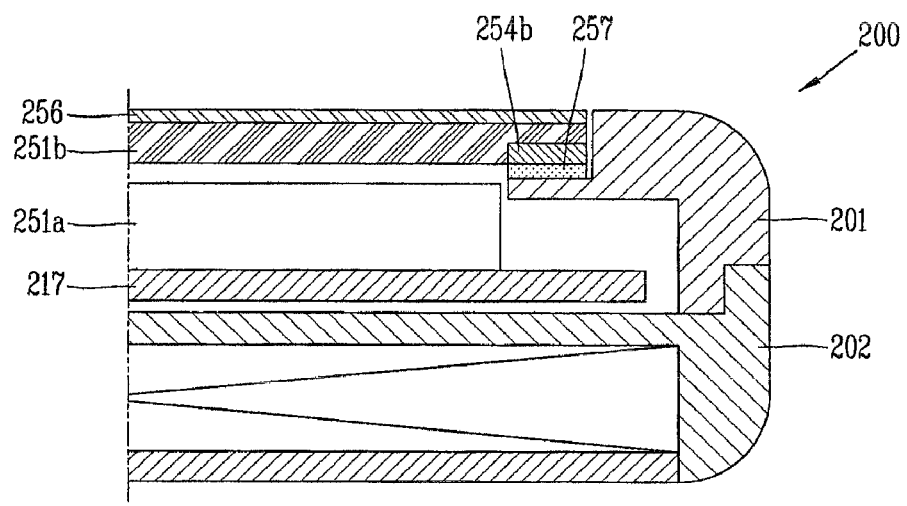
FIGS. 6A and 6B are partial sectional views showing variations of the mobile terminal of FIG. 5.
Figure 6B:
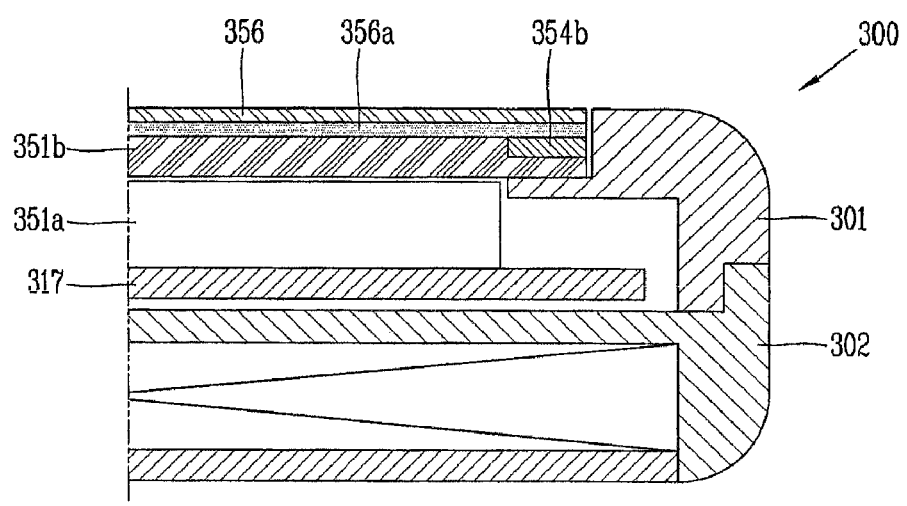

Hereinafter, variations of the mobile terminal 100 of FIG. 4 will be described. FIGS. 6A and 6B are partial sectional views showing variations 200 and 300 of the mobile terminal of FIG. 5.

Referring to FIG. 6A, a touch sensor 256 of a mobile terminal 200 may be mounted onto an upper surface of a window 251b. The touch sensor 256 may be configured to convert a pressure applied to a specific portion of the display unit 151 (see FIG. 2A) into an electric input signal. The touch sensor 256 may be printed with a transparent electrode film, for example, ITO film, thus to sense a contact with a specific portion.

Referring to FIG. 6B, a recess portion 354a may be formed on an upper surface of a window 351b in a mobile terminal 300, and a touch sensor 356 may be mounted onto the upper surface of the window 351b. A piezoelectric substrate 354b accommodated in the recess portion 354a may be disposed between the window 351b and the touch sensor 356. As such, the piezoelectric substrate 354b present on the upper surface of the window 351b can implement a stronger and faster vibration response responsive to a touch input applied onto the upper surface of the window 351b.

A transparent base substrate 356a may be disposed between the touch sensor 356 and the window 351b. The base substrate 356a may have a preset rigidity, and configure a touch panel together with the touch sensor 356. With this structure, a direct transfer of a vibration of the piezoelectric substrate 354b to the touch sensor 356 can be attenuated or prevented.

Still referring to FIG. 6B, the window 351b may be mounted on to a front case 301. In detail, as the piezoelectric substrate 354b is disposed on the upper surface of the window 351b, the vibration of the piezoelectric substrate 354b may be transferred better to the window 351b than to the front case 301. Accordingly, the window 351b may be mounted directly onto the front case 301 in a manner of bonding or adhesion using a double sided tape.

Figure 7A:
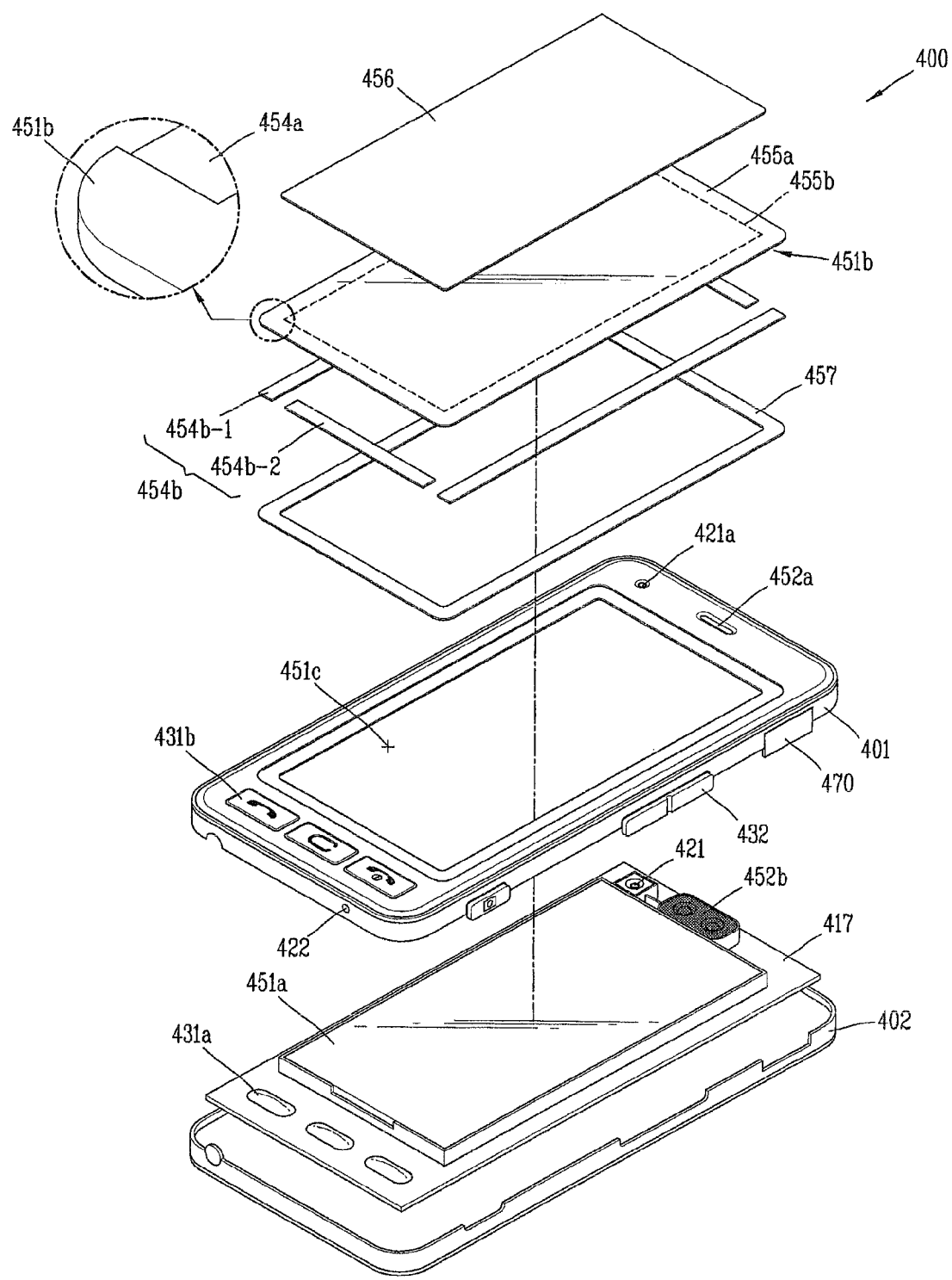
FIG. 7A is a disassembled view showing another embodiment of a mobile terminal in accordance with the present invention.
Figure 7B:
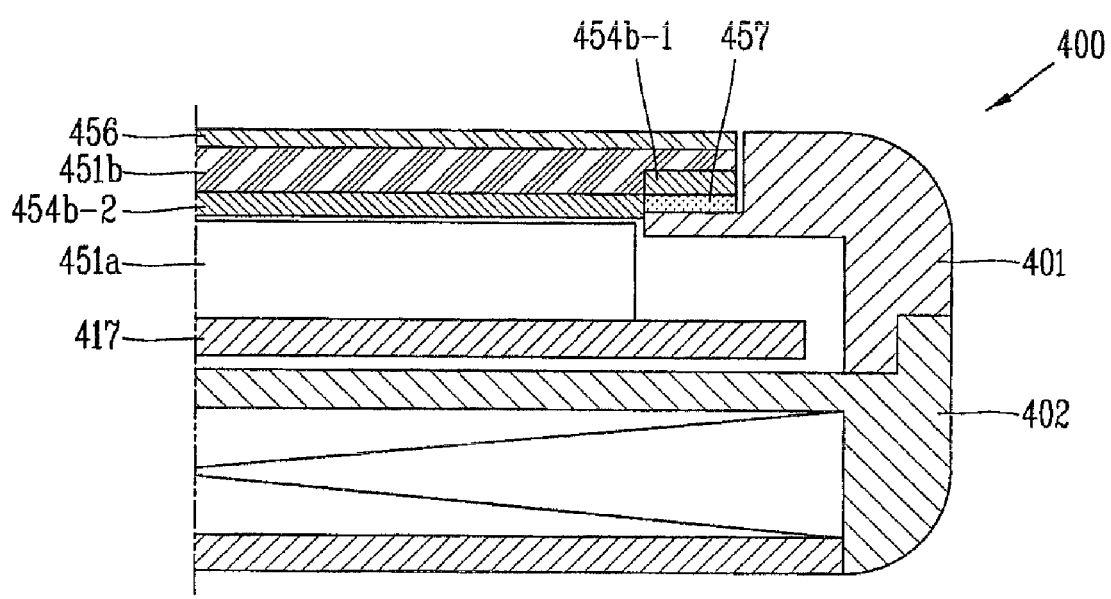
FIG. 7B is a partial sectional view showing a coupled state of a piezoelectric substrate and an elastic member to a window in FIG. 7A.

FIG. 7A is a disassembled view showing another embodiment of a mobile terminal in accordance with the present invention, and FIG. 7B is a partial sectional view showing a coupled state of a piezoelectric substrate 454b and an elastic member 457 to a window 451b in FIG. 7A.

Referring to FIGS. 7A and 7B, a piezoelectric substrate 454b may include first and second piezoelectric substrates 454b-1 and 454b-2.

The first piezoelectric substrate 454b-1 may be accommodated in a recess portion 454a of a window 451b. The recess portion 454a may be formed by extending from the edge region 155a (see FIG. 4) of the window 451b in one direction along a longer edge of the window 451b, like the recess portion 154a shown in FIG. 4. However, the present invention may not be limited to this structure, but the recess portion 454a may be formed along a shorter edge of the window 451b.

The second piezoelectric substrate 454b-2 may be disposed to obscure one surface of the window 451b. The second piezoelectric substrate 454b-2 may be formed shorter in length than the first piezoelectric substrate 454b-1, so as to be adjacent to a shorter edge of the window 451b. That is, the second piezoelectric substrate 454b-2 may not be accommodated in the recess portion 454a of the window 451b, but rather disposed at one surface of the window 451b in an intersecting direction with the first piezoelectric substrate 454b-1.

An elastic member 457 may be mounted onto one surface of the first piezoelectric substrate 454b-1, and the second piezoelectric substrate 454b-2 may be mounted onto a front case 401. With the structure, the first piezoelectric substrate 454b-1 may usually transfer the vibration to the window 451b, and the second piezoelectric substrate 454b-2 may transfer the vibration both to the window 451b and to the front case 401.

The vibration of the first piezoelectric substrate 454b-1 may be a haptic vibration as a feedback responsive to a touch input and the vibration of the second piezoelectric substrate 454b-2 may be a vibration of each case 401 and 402 output when the mobile terminal in a vibration mode receives a signal for a wireless communication.

Figure 8A:
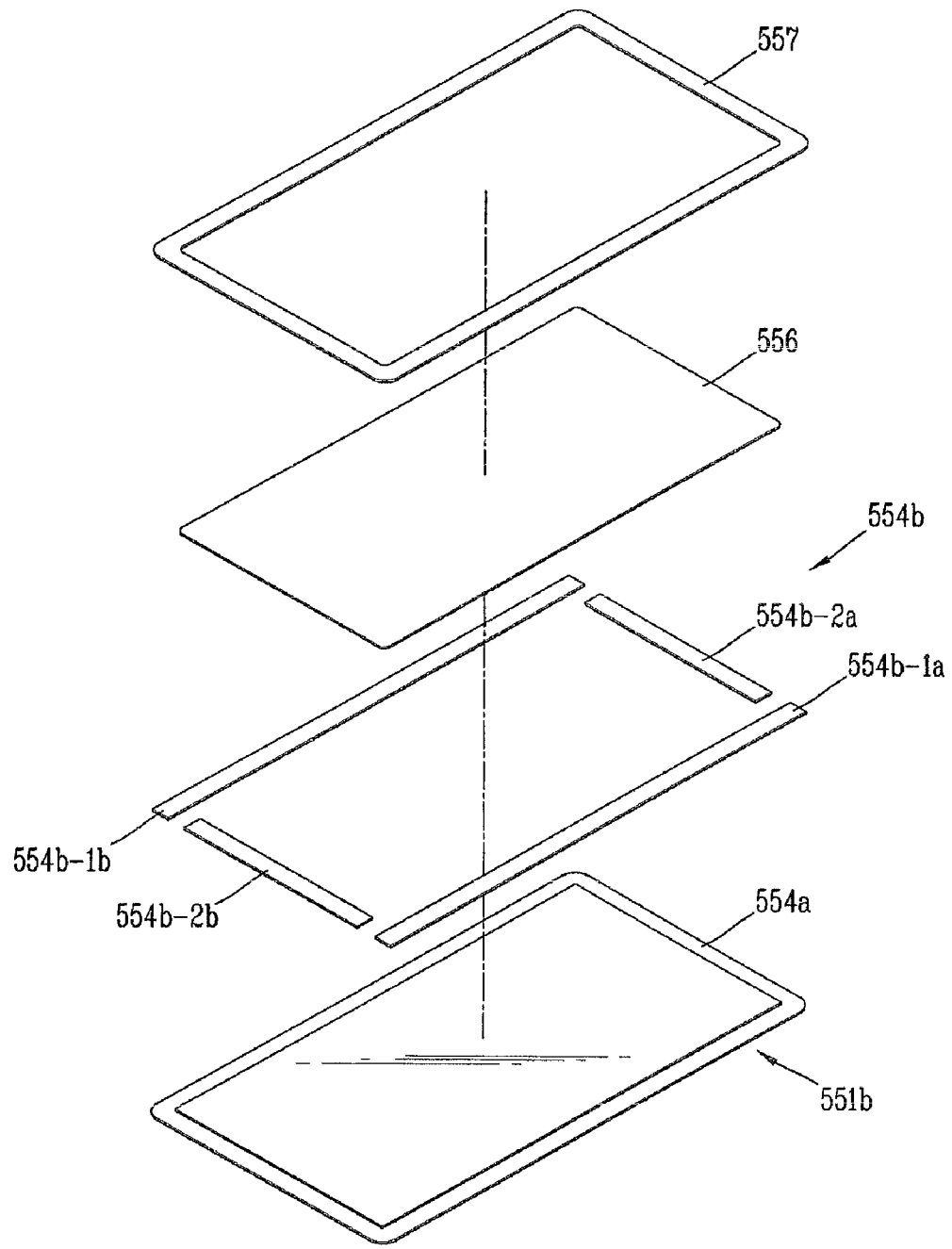
FIG. 8A is a disassembled view showing a rear surface of a window in accordance with another embodiment of a mobile terminal of the present invention.
Figure 8B:
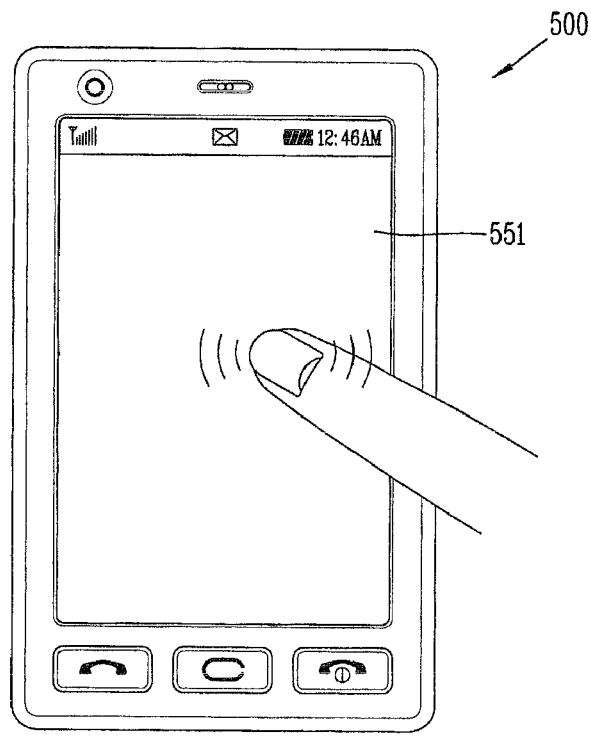
FIGS. 8B and 8C are a front view and a side view showing an exemplary operation of the mobile terminal having the window of FIG. 8A.
Figure 8C:
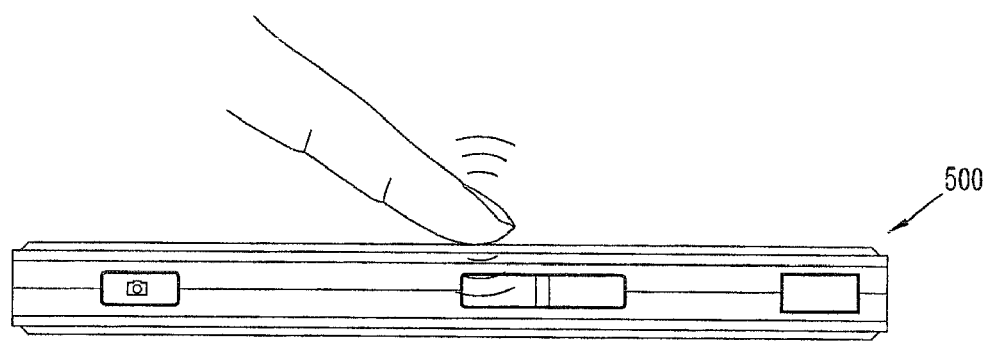

FIG. 8A is a disassembled view showing a rear surface of a window 551b in accordance with another embodiment of a mobile terminal 500 of the present invention, and FIGS. 8B and 8C are a front view and a side view showing an exemplary operation of the mobile terminal 500 having the window of FIG. 8A.

Referring to FIG. 8A, four sides are defined on the edge region 155a (see FIG. 4) of a window 551b, and a recess portion 554a may be formed in a form of a closed loop along the four sides. The piezoelectric substrate 554b may be provided in plurality to be mounted onto the four sides in an intersecting manner. The piezoelectric substrates 554b-1a and 554b-2a mounted in the intersecting manner may be formed to generate vibration in different directions. In more detail, the piezoelectric substrate 554b may be disposed at each of the four sides of the window 551b, and the piezoelectric substrates 554b-1a and 554b-1b present on both sides facing each other, of the four sides, may generate a vibration in different directions from the piezoelectric substrates 554b-2a and 554b-2b mounted onto the other both sides facing each other.

For instance, the piezoelectric substrate 554b may be divided into the piezoelectric substrates 554b-1a and 554b-1b vibrated in right and left directions and the piezoelectric substrates 554b-2a and 554b-2b vibrated up and down. Those piezoelectric substrates 554b-1a, 554b-1b, 554b-2a and 554b-2b may be combined to implement various types of vibration. Referring to FIG. 8B, the piezoelectric substrates 554b-1a and 554b-1b vibrated in right and left directions vibrate the display unit 551 in the right and left directions in response to a user's touch input, and referring to FIG. 8C, the piezoelectric substrates 554b-2a and 554b-2b vibrated up and down vibrate the display 551 (see FIG. 8A) up and down in response to a user's touch input. The vibration direction may be preset according to a test to be appropriate for a user's sensibility.

Figure 9:
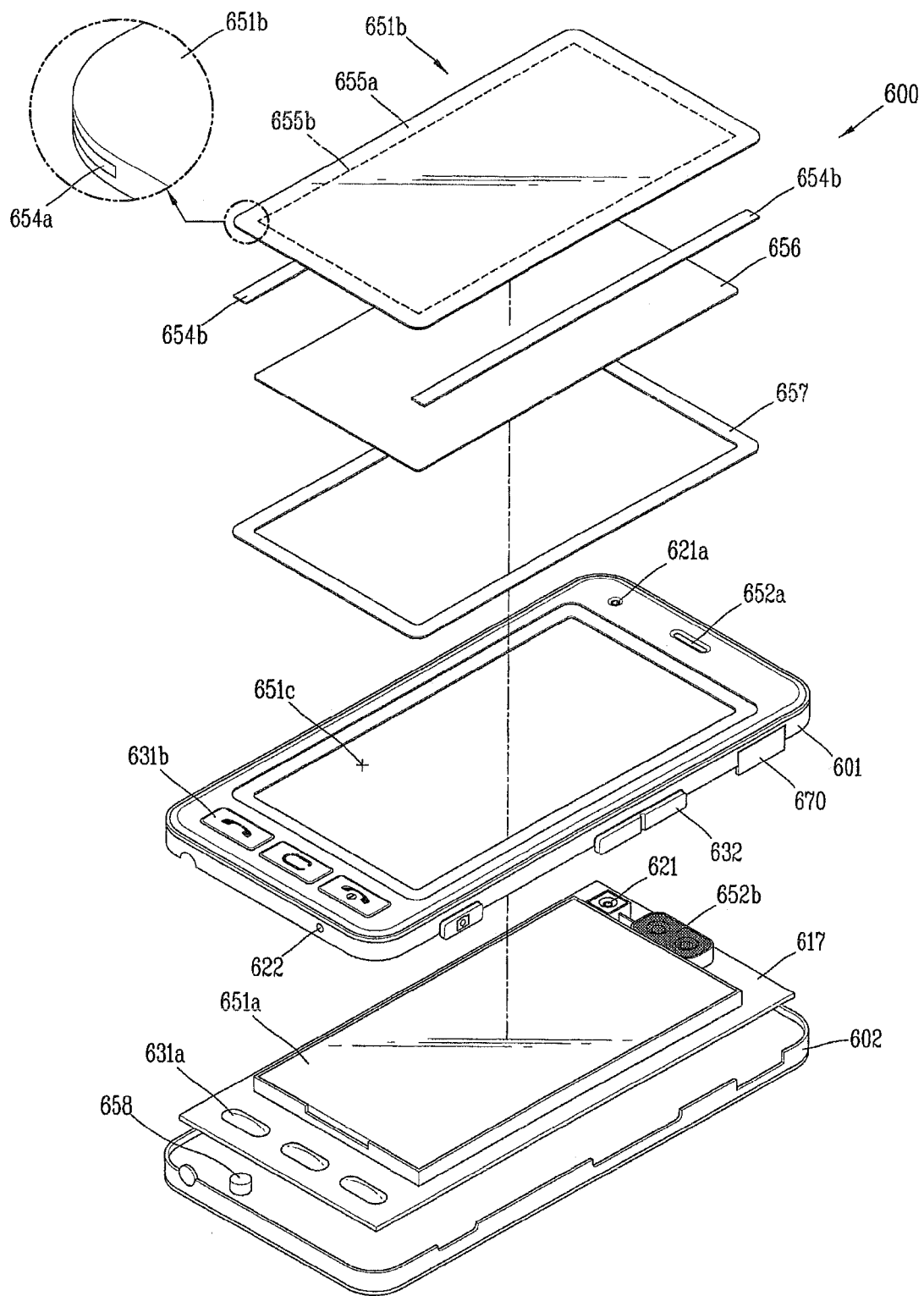
FIG. 9 is a disassembled view showing another embodiment of a mobile terminal in accordance with the present invention.
Figure 10:
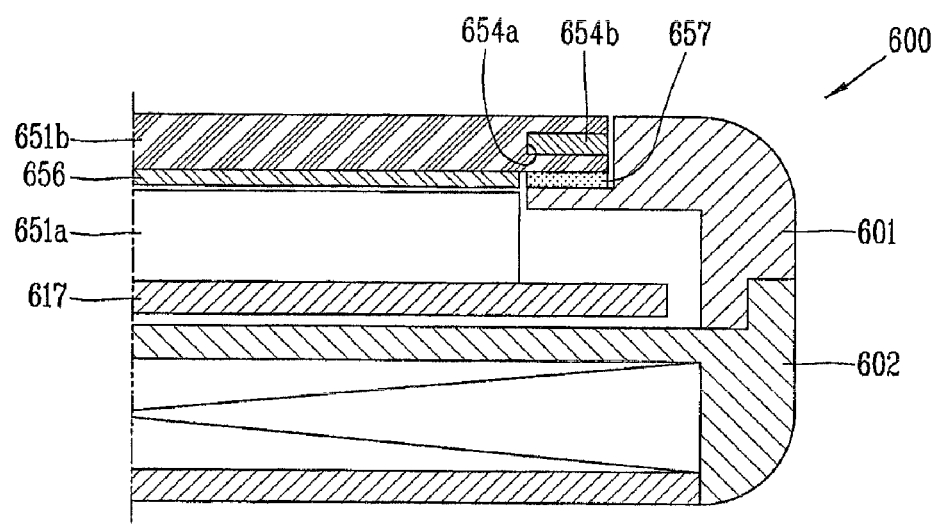
FIG. 10 is a partial sectional view of the mobile terminal of FIG. 9.
Figure 11:
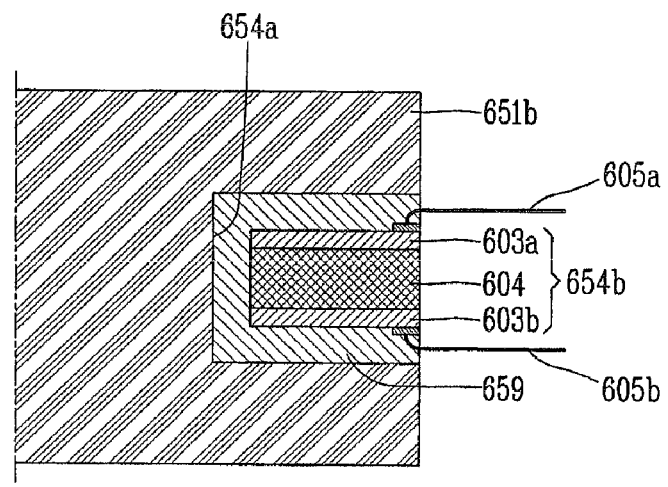
FIG. 11 is an enlarged view of a recess portion of the mobile terminal shown in FIG. 9.

FIG. 9 is a disassembled view showing another embodiment of a mobile terminal in accordance with the present invention, FIG. 10 is a partial sectional view of the mobile terminal 600 of FIG. 9, and FIG. 11 is an enlarged view of a recess portion 654a of the mobile terminal 600 shown in FIG. 9.

Referring to FIGS. 9 to 11, a touch sensor 656 may be disposed on one surface of both surfaces of a window 651b facing each other, and a recess portion 654a may be formed on a side surface of the window 651b intersecting both side surfaces of the window 651b facing each other.

An opening for communicating the recess portion 654a with the exterior may be formed at the side surface of the window 651b such that the piezoelectric substrates 654b can be inserted in the recess portion 654a. The recess portion 654a may be formed by being concavely recessed into the opening. The recess portion 654a may be formed at the window 651b configured as a plate by a numerical control processing or a step processing with a wire cut-off machine.

Referring to FIG. 11, the piezoelectric substrate 654b is inserted into the recess portion 654a through the opening, and a filler 659 is filled between the recess portion 654a and the piezoelectric substrate 654b. The filler 659 may be hardened by radiation of ray (light), for example, by radiation of ultraviolet rays, accordingly, the piezoelectric substrate 654b is bonded to the recess portion 654a. Here, the hardening of the filler 659 may not be limited to this manner, but other methods, for example, a thermal hardening or the like, may be employed.

Referring to the drawings, an elastic member 657 may be disposed at one surface of the window 651b. The elastic member 657 may be present between the front case 601 and the window 651b to attenuate a vibration of the piezoelectric substrate 654b transferred to the front case 601. The touch sensor 656 may be mounted to one surface of the window 651b having the elastic member 657.

The piezoelectric substrate 654b may include electrodes 603a and 603b formed on both surfaces facing each other. That is, the electrodes 603a and 603b may be provided at both surfaces of a piezoelectric board 604 which converts electric energy into vibration energy.

The piezoelectric substrate 654b may be disposed such that the electrodes 603a and 603b respectively face surfaces (i.e., both side surfaces of the recess portion perpendicular to the opening) defining the recess portion 654a. Electric wires 605a and 605b may be mounted to the electrodes 603a and 603b to be electrically connected to a circuit board 617 (see FIG. 9), which controls the piezoelectric substrate 654b. With the wire structure, the electric wires 605a and 605b may extend to the circuit board 617 via a spaced gap between the piezoelectric substrate 654b and the recess portion 654a, namely, the space filled with the filler 659. If the piezoelectric substrate 654b directly comes in contact with the window 651b, the electric wires 605a and 605b coupled to both surfaces of the piezoelectric substrate 654b may create a gap between the piezoelectric substrate 654b and the window 651b; however, in the present invention, the piezoelectric substrate 654b and the window 651b may be adhesively coupled to each other because the electric wires 605a and 605b are disposed in the spaced gap and the filler 659 is filled therein. Also, with this structure, wiring for both surfaces of the piezoelectric substrate 654b may be available in a slimmer space.

Figure 12:
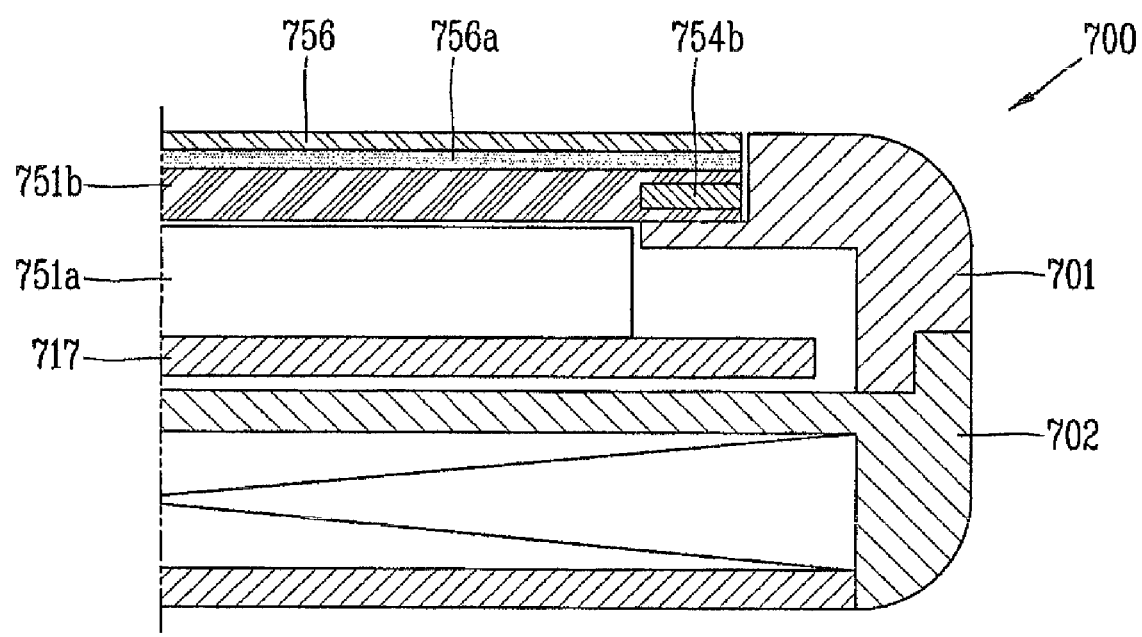
FIG. 12 is a partial sectional view showing a variation of the mobile terminal shown in FIG. 9.

Hereinafter, a variation of the mobile terminal 600 of FIG. will be described. FIG. 12 is a partial sectional view showing a variation 700 of the mobile terminal shown in FIG. 9.

Referring to FIG. 12, a window 751b may be adhered directly onto a front case 701 in a bonding manner or by use of a double sided tape, and a touch sensor 756 may be disposed on an upper surface of the window 751b. A transparent base substrate 756a may be disposed between the touch sensor 756 and the window 751b. The base substrate 756a may have a preset rigidity, and configure a touch panel together with the touch sensor 756. Accordingly, a direct transfer of a vibration of the piezoelectric substrate 754b to the touch sensor 756 via the base substrate 756a can be attenuated or prevented.

The mobile terminal according to at least one embodiment of the present invention with the configuration can implement a superior vibration transfer property with respect to the window through the piezoelectric substrate accommodated in the recess portion, thereby realizing a slimmer mobile terminal.

In the present invention, the employment of the elastic member allows attenuation of a vibration transferred to a case, and also an independent control of the vibration transfer to the window and the case.

In the present invention, the recess portion accommodating the piezoelectric substrate can be filled with the filler, thereby allowing wiring with respect to both surfaces of the piezoelectric substrate in a slimmer space.

The configurations and methods of the mobile terminal in the aforesaid embodiments may not be limitedly applied, but such embodiments may be configured by a selective combination of all or part of each embodiment so as to derive many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a main body having a display module;
a window on a case of the main body to cover at least a portion of the display module, the window including a recessed portion at an edge region formed along at least one side of the window;
a touch sensor provided at the window to detect a touch input;
a first piezoelectric substrate provided in the recessed portion of the window to generate a vibration in response to the touch input, the first piezoelectric substrate provided in a bar-like shape that corresponds to the recessed portion;
a second piezoelectric substrate to cover the edge region of the window in an intersecting direction with the first piezoelectric substrate, the second piezoelectric substrate being provided at the case; and
an elastic member disposed between the case and the first piezoelectric substrate to attenuate a vibration of the first piezoelectric substrate transferred to the case,
wherein the first piezoelectric substrate is configured to substantially transfer the vibration to the window, and the second piezoelectric substrate is configured to transfer the vibration to both the window and the case.

2. The terminal of claim 1, further comprising a vibration motor provided in the case to generate a vibration with a different strength than the vibration generated by the first piezoelectric substrate.

3. The terminal of claim 1, wherein the first piezoelectric substrate and the second piezoelectric substrate form a loop covering the edge region of the window.

4. The terminal of claim 3, wherein the first piezoelectric substrate and the second piezoelectric substrate vibrate in different directions, respectively.

5. The terminal of claim 1, wherein the recessed portion is stepped with respect to a principal surface of the window,
   wherein the first piezoelectric substrate is provided in the recessed portion such that at least one surface of the first piezoelectric substrate is flush with the principal surface of the window.

6. The terminal of claim 1, wherein the recessed portion is formed at a side surface of the window.

7. The terminal of claim 1, wherein the first piezoelectric substrate comprises electrodes and wires provided at the electrodes, respectively, to allow an electric connection with a circuit board for controlling the first piezoelectric substrate.

8. A mobile terminal comprising:
   a body having a display module;
   a window on a case of the body to cover a portion of the display module, the window including a first edge region along a first side of the window, and a second edge region along a second side of the window that is transverse to the first side, wherein a recess is provided at the first edge region;
   a touch sensor to detect a touch input;
   a first piezoelectric substrate in the recess to provide a vibration based on the touch input, the first piezoelectric substrate having a bar shape that corresponds to the recess;
   a second piezoelectric substrate to cover the second edge region of the window, the second piezoelectric substrate to provide a vibration based on the touch input, the second piezoelectric substrate being provided at the case, wherein the first piezoelectric substrate to substantially transfer the vibration from the first piezoelectric substrate to the window, and the second piezoelectric substrate to transfer the vibration from the second piezoelectric substrate to both the window and to the case; and
   an elastic member between the case and the first piezoelectric substrate to attenuate a vibration of the first piezoelectric substrate transferred to the case.

9. The terminal of claim 8, further comprising a vibration motor to provide a vibration having a different strength than the vibration provided by the first piezoelectric substrate.

10. The terminal of claim 8, wherein the first piezoelectric substrate to cover the first edge region of the window, and the second piezoelectric substrate to cover the second edge region of the window.

11. The terminal of claim 10, wherein the first piezoelectric substrate to vibrate in a first direction and the second piezoelectric substrate to vibrate in a second direction different than the first direction.

12. The terminal of claim 8, wherein the recess is stepped with respect to a main surface of the window,
   wherein the first piezoelectric substrate is provided in the recess such that a surface of the first piezoelectric substrate is substantially flush with the main surface of the window.

13. The terminal of claim 8, wherein the recess is formed at a side surface of the window.

14. The terminal of claim 8, wherein the first piezoelectric substrate includes electrodes and wires provided at the electrodes, respectively, to provide an electric connection with a circuit board for controlling the first piezoelectric substrate.

* * * * *